United States Patent [19]

Furuhashi et al.

[11] 4,367,531
[45] Jan. 4, 1983

[54] METHOD AND APPARATUS FOR CONTROLLING IGNITION TIMING OF INTERNAL COMBUSTION ENGINE

[75] Inventors: Toshio Furuhashi, Mito; Noboru Sugiura, Katsuta, both of Japan

[73] Assignee: Hitachi, Ltd., Tokyo, Japan

[21] Appl. No.: 151,987

[22] Filed: May 21, 1980

[30] Foreign Application Priority Data

May 25, 1979 [JP] Japan .................................. 54-63871
Aug. 20, 1979 [JP] Japan ................................. 54-105038

[51] Int. Cl.³ .............................................. F02P 5/14
[52] U.S. Cl. ............................... 364/431.08; 123/416; 123/425; 73/35
[58] Field of Search ...................... 364/424, 431, 442; 123/416, 425; 73/35

[56] References Cited

U.S. PATENT DOCUMENTS

| | | | |
|---|---|---|---|
| 4,002,155 | 1/1977 | Harned et al. | 123/425 X |
| 4,012,942 | 3/1977 | Harned | 73/35 |
| 4,061,116 | 12/1977 | Saida et al. | 123/416 X |
| 4,153,020 | 5/1979 | King et al. | 73/35 X |
| 4,201,161 | 5/1980 | Sasayama et al. | 123/416 X |
| 4,229,793 | 10/1980 | Yoshida et al. | 364/431 |
| 4,233,944 | 11/1980 | Omori et al. | 123/425 X |
| 4,240,388 | 12/1980 | Omori et al. | 123/425 |
| 4,243,008 | 1/1981 | Omori et al. | 123/425 |
| 4,245,602 | 1/1981 | Omori et al. | 123/425 |
| 4,249,494 | 2/1981 | Guipaud | 123/425 |
| 4,268,910 | 5/1981 | Omori et al. | 364/431 |
| 4,269,155 | 5/1981 | Iwata et al. | 123/425 |
| 4,274,379 | 6/1981 | Iwata et al. | 123/425 |
| 4,290,398 | 9/1981 | Hattori et al. | 123/425 |

FOREIGN PATENT DOCUMENTS 50-63345 5/1975 Japan .................................. 364/431

Primary Examiner—Felix D. Gruber
Attorney, Agent, or Firm—Antonelli, Terry and Wands

[57] ABSTRACT

Method and apparatus for controlling ignition timing of an internal combustion engine employing rotation speed information and load information of the engine to determine ignition timing data. A correction amount used to retard the ignition timing and representative of the magnitude of knocking is produced when knocking of the engine is detected. The ignition timing data is corrected in the direction of retardation based on the correction amount, and the ignition timing data is advanced at a predetermined cycle by a desired angle at a time during the time period in which knocking is not detected.

25 Claims, 12 Drawing Figures

METHOD AND APPARATUS FOR CONTROLLING IGNITION TIMING OF INTERNAL COMBUSTION ENGINE

BACKGROUND OF THE INVENTION

The present invention relates to method and apparatus for controlling the ignition timing of an internal combustion engine, and more particularly to method and apparatus for controlling the ignition timing of an internal combustion engine by detecting the occurrence of knocking.

The occurrence of knocking in an internal combustion engine creates an unpleasant sensation to the driver because of knocking noise and results in a decrease of engine output due to the generation of counter-torque or the braking of the engine due to overheating of the engine. The knocking has a close relation with ignition timing of the engine, and it has been known that a maximum engine output is obtainable by establishing the ignition timing or ignition advance angle to a point immediately before the knocking point in view of the characteristic of the engine. The selection of a small ignition advance angle to avoid the occurrence of knocking leads to a reduction of engine output and hence it is desired to set the ignition timing to the point immediately before the knocking point.

U.S. Pat. No. 4,002,155 discloses a method for controlling the ignition timing in which the ignition advance angle is retarded when the occurrence of knocking is detected and then the ignition advance angle is gradually advanced, and when the knocking again occurs during the process of advancing the angle, the ignition advance angle is again retarded, and the above step is repeated.

In the disclosed control method, the ignition timing is always advanced toward the advance angle and when the knocking occurs, the angle is retarded. Accordingly, the engine torque varies depending on the frequency of knocking and the variation of torque adversely affects the operability of the engine. If the magnitude of the angle to be retarded when knocking occurs is selected to be small to minimize the effect, knocking cannot be rapidly stopped and hence the disadvantages resulting from the knocking cannot be fully eliminated.

SUMMARY OF THE INVENTION

It is an object of the present invention to provide a method and an apparatus for controlling the ignition timing of an internal combustion engine in which the ignition timing of an engine is set to a point immediately before the knocking point to enhance the engine efficiency.

It is another object of the present invention to provide a method and an apparatus for controlling the ignition timing of an internal combustion engine in which knocking is rapidly stopped and a variation of engine torque due to the control of the ignition timing when knocking is detected is minimized.

It is a further object of the present invention to provide a method and an apparatus for controlling the ignition timing of an internal combustion engine in which a knocking signal sensed by a knocking sensor is processed by software to avoid an increase of the number in components which would otherwise be required due to the complex engine control.

According to a feature of the present invention, knocking is rapidly stopped by applying a retardation angle signal proportional to the magnitude of knocking when it is detected by a control system for the ignition timing of the engine.

According to another feature of the present invention, a predetermined time period which approximates the maximum duration of normally occurring light knocking is preset, and the predetermined time period is counted from the start of knocking, and at the end of the predetermined period the ignition timing control system carries out the retardation of the angle independently whether the knocking is still occurring or not so that the knocking is fractionally and rapidly stopped so as to minimize a variation of the engine torque.

According to a further feature of the present invention, the engine ignition timing control system interrupts the normal operation for a retardation angle correction operation in response to the detection of the occurrence of knocking.

The above and other objects, features and advantages of the present invention will be apparent from the following detailed description of the preferred embodiment of the present invention when taken in connection with the accompanying drawings.

BRIEF DESCRIPTION OF THE DRAWINGS

FIGS. 7 and 8 are flow charts showing a knocking signal processing routine in which FIG. 7 is for hardware implementation and FIG. 8 is for software implementation;

DETAILED DESCRIPTION

Figure 1:
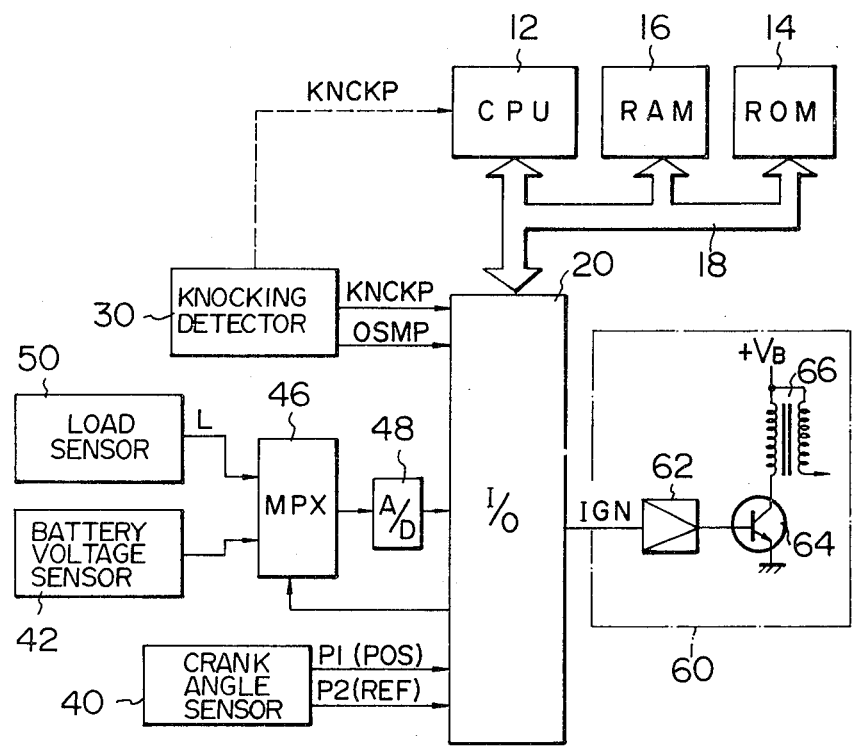
FIG. 1 is a block diagram showing one embodiment of an engine ignition timing control system according to the present invention.

The present invention will now be explained in detail with reference to the preferred embodiments shown in the drawings.

FIG. 1 shows an ignition timing control apparatus for controlling the ignition timing in an internal combustion engine control system for controlling an internal combustion engine. In FIG. 1, a CPU 12 is a central processing unit for digitally processing various data such as engine ignition timing, a ROM 14 is a memory unit for storing control programs such as an ignition timing control program and fixed data, and a RAM 16 is a readable and writable memory unit. An I/O interface circuit 20 receives signals from various sensors and sends them to the CPU 12 via a bus 18 and it also sends an ignition timing signal IGN generated in response to a control signal produced by the CPU 12 to an ignition coil driving circuit 60. In the present embodiment, the sensors include a knocking detector 30 and a crank angle sensor 40 for producing pulse sequence signals, and a battery voltage sensor and a load sensor 44 for producing analog signals.

The output signal from the crank angle sensor 40 is applied directly to the I/O interface circuit 20 while the output signals from the battery voltage sensor 42 and the load sensor 44 are time-divided by a multiplexer 46 which is controlled by a control signal from the I/O interface circuit 20 and converted to digital signals by an analog-digital converter (ADC) 48, which digital signals are then applied to the I/O interface circuit 20.

The knocking detector 30 produces pulses KNCKP in response to knocking occurring in the engine and also produces a time signal OSMP which changes its level for a predetermined time period in response to the first pulse produced. For example, the time signal OSMP may be produced by a one-shot multivibrator.

The crank angle sensor 40 and the load sensor 50 are provided to produce information on which the calculation of a basic ignition timing $\theta_{ADV}$ is based. The crank angle sensor 40 produces a reference crank angle signal (REF) P1 and a position pulse signal (POS) P2, and the load sensor 50 in the present embodiment produces the load signal from a suction manifold negative pressure.

The ignition coil driving circuit 60 comprises an amplifier 62, a power transistor 64 and an ignition coil 66. An ignition signal IGN from the I/O interface circuit 20 is amplified by the amplifier 62 and then applied to the transistor 64 which controls a conduction current flowing through an ignition coil 66 to define a predetermined ignition timing.

Figure 2:
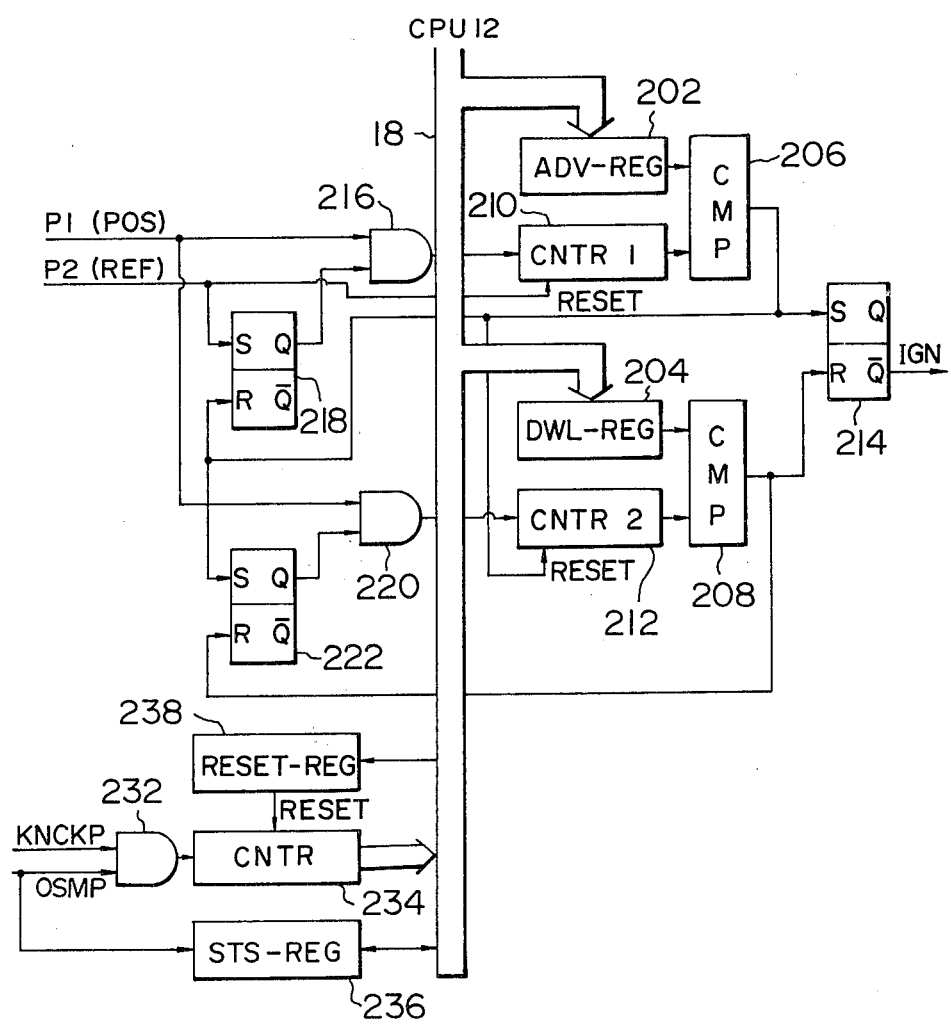
FIG. 2 is a block diagram showing the configuration of an interface circuit shown in FIG. 1.

FIG. 2 shows a particular circuit configuration which contributes to the ignition timing control in the I/O interface circuit 20. In FIG. 2, the ignition timing data $\theta_{ADV}$ and conduction start timing data $\theta_{DWL}$ for the ignition coil 66 calculated in the CPU 12 are loaded in an advance register (ADV-REG) 202 and a dwell register (DWL-REG) 204, respectively, through a bus 18. The output from the advance register 202 is applied to a comparator 206 while the output from the dwell register 204 is applied to a comparator 208. The comparator 206 produces an output pulse when a count of a first counter register 210 reaches a preset count for the advanced register 202 while the comparator 208 produces an output pulse when a count of a second counter register 212 reaches a preset count for the dwell register 204. The comparator 206 produces an ignition timing pulse while the comparator 208 produces a conduction start timing pulse. An R-S flip-flop 214 is repeatedly turned on and off in response to the outputs from the comparators 206 and 208 with the Q-output thereof providing the ignition signal IGN.

To achieve the ignition timing control described above, the first counter register 210 counts up the position pulse signals P1 supplied via an AND gate 216 which is enabled by the Q-output from an R-S flip-flop 218 which is set by the reference crank angle signal P2. The first counter register 210 is reset by the reference crank angle signal P2 while the R-S flip-flop 218 is reset by the output from the comparator 206. When the R-S flip-flop 218 which has been reset by the output from the comparator 206 is set by the reference crank angle signal P2, the AND gate 216 is enabled by the position pulse signal P1 so that the first counter 210 is enabled to count up the position pulse signals P1 until the reference crank angle signal P2 is produced.

The second counter register 212 also counts up the position pulse signals P1 through an AND gate 220 but the condition for opening the AND gate 220 differs from that for the AND gate 216. That is, the AND gate 220 is enabled by the Q-output of an R-S flip-flop which is set by the output of the comparator 206 which also resets the R-S flip-flop 218. The R-S flip-flop 222 is reset by the output of the comparator 208. Thus, after the comparator 206 has produced an output, the second counter register 212 counts up the position pulse signals P1 until the count thereof reaches the preset value of the dwell register 204.

The output pulses KNCKP from the knocking detector 30 and the OSMP are applied to a counter register 234 through an AND gate 232 so that the counter register 234 counts up the knocking signals KNCKP occurring during the duration of the time signal OSMP. At the end of the count, a status register 236 requests interruption to the CPU 12 so that the content of the counter register 234 is loaded in the CPU 12 through the bus 18 and the content of the counter register 234 is cleared to be ready for the occurrence of next knocking. The pulse count NP loaded in the CPU 12 is indicative of the magnitude of knocking and it is used to calculate the amount of correction for the ignition timing, that is, $\Delta\theta_{ADV1} = f(NP)$.

The status register 236 essentially comprises a flip-flop which is set by the trailing edge of the time signal OSMP to produce an interruption request signal which is then applied to the CPU 12. The counter register 234 is reset by the output from a reset register 238 which applies the reset signal to the counter register 234 in response to an instruction from the CPU 12 after the contents NP of the counter register 234 have been loaded to the CPU 12.

The count NP loaded to the CPU 12 is indicative of the magnitude of knocking. It has been well known that the frequency of knocking is constant, at approximately 7 KHz, and the larger the magnitude of knocking, the longer is the duration of knocking. Accordingly, the number of knocking pulses KNCKP detected during the predetermined time period which starts in synchronism with the start of knocking is proportional to the magnitude of knocking. In the present invention, the amount of correction $\Delta\theta_{ADV1}$ which is used to retard the ignition timing depending on the magnitude of knocking is calculated in accordance with $\Delta\theta_{ADV1} = f(NP)$.

The results of processing operations by the CPU 12 in accordance with the ignition timing control program are loaded to the registers 202 and 204 and the desired ignition signal IGN is produced at the flip-flop 214. When knocking occurs, an interruption request is issued by the time pulse OSMP and the count of pulses generated during the predetermined time period to represent the magnitude of knocking is loaded to the CPU 12 which calculates the amount of correction to correct the ignition advance angle. Once the correction is made, the ignition timing is incremented toward the advance angle by a minimum correction unit.

Figure 3:
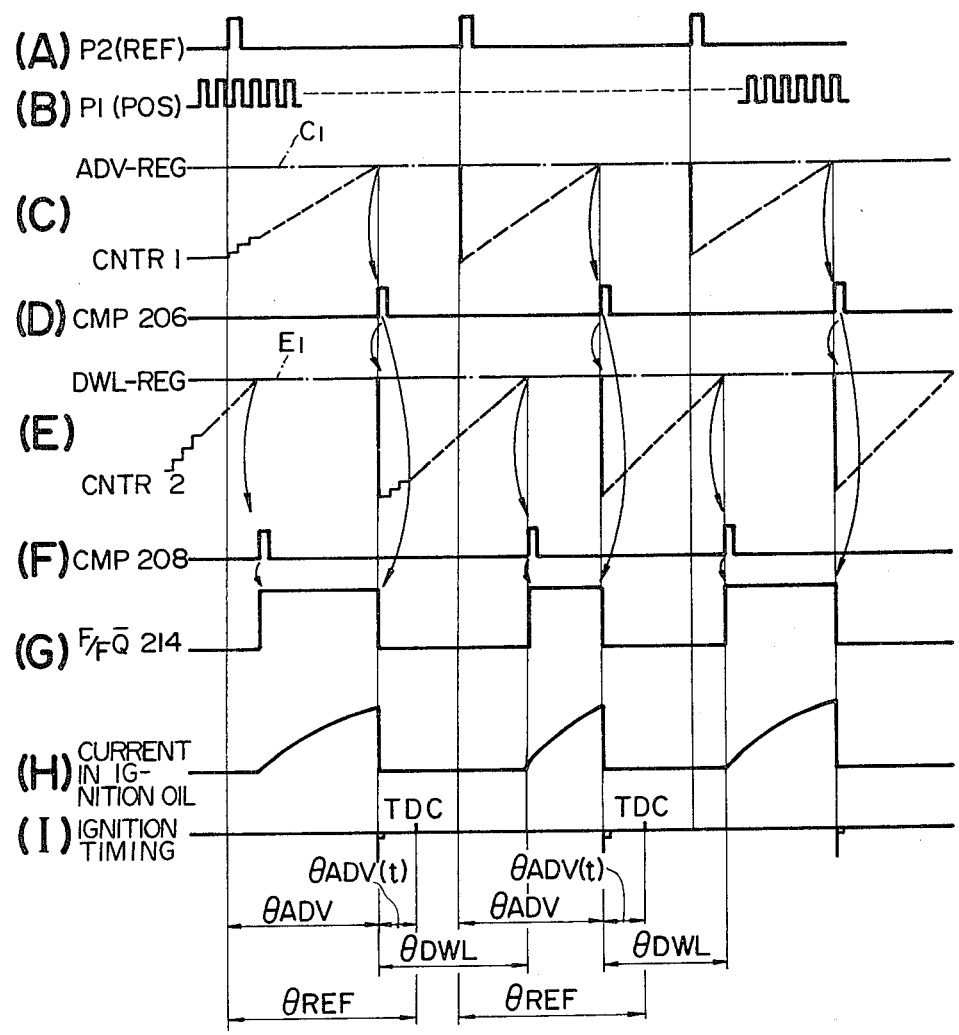
FIG. 3 shows waveforms at various points in the circuit shown in FIG. 2.

FIG. 3 shows a timing chart illustrating the operation of the circuit shown in FIG. 2. In FIG. 3, (A) indicates the reference crank angle signal P2, (B) indicates the position pulse signal P1, (C) indicates the count in the first counter register 210, C1 indicates a preset value for the advance register 202, (D) indicates the output signal from the comparator 206 showing that the output is produced when the count of the first counter register 210 reaches the preset count for the advance register 202, (E) indicates the count of the second counter register 212, E1 indicates the preset count for the dwell register 204, (F) indicates the output from the comparator 208 which operates in the same manner as the comparator 206, (G) indicates the Q-output of the R-S flip-flop 214 which responds to the outputs from the comparators 206 and 208, i.e. the pulses shown in (D) and (F), (H) indicates an ignition coil current in the ignition coil 66 which flows in response to the Q-output of the flip-flop 214, and (I) indicates the ignition timing.

Figure 4:
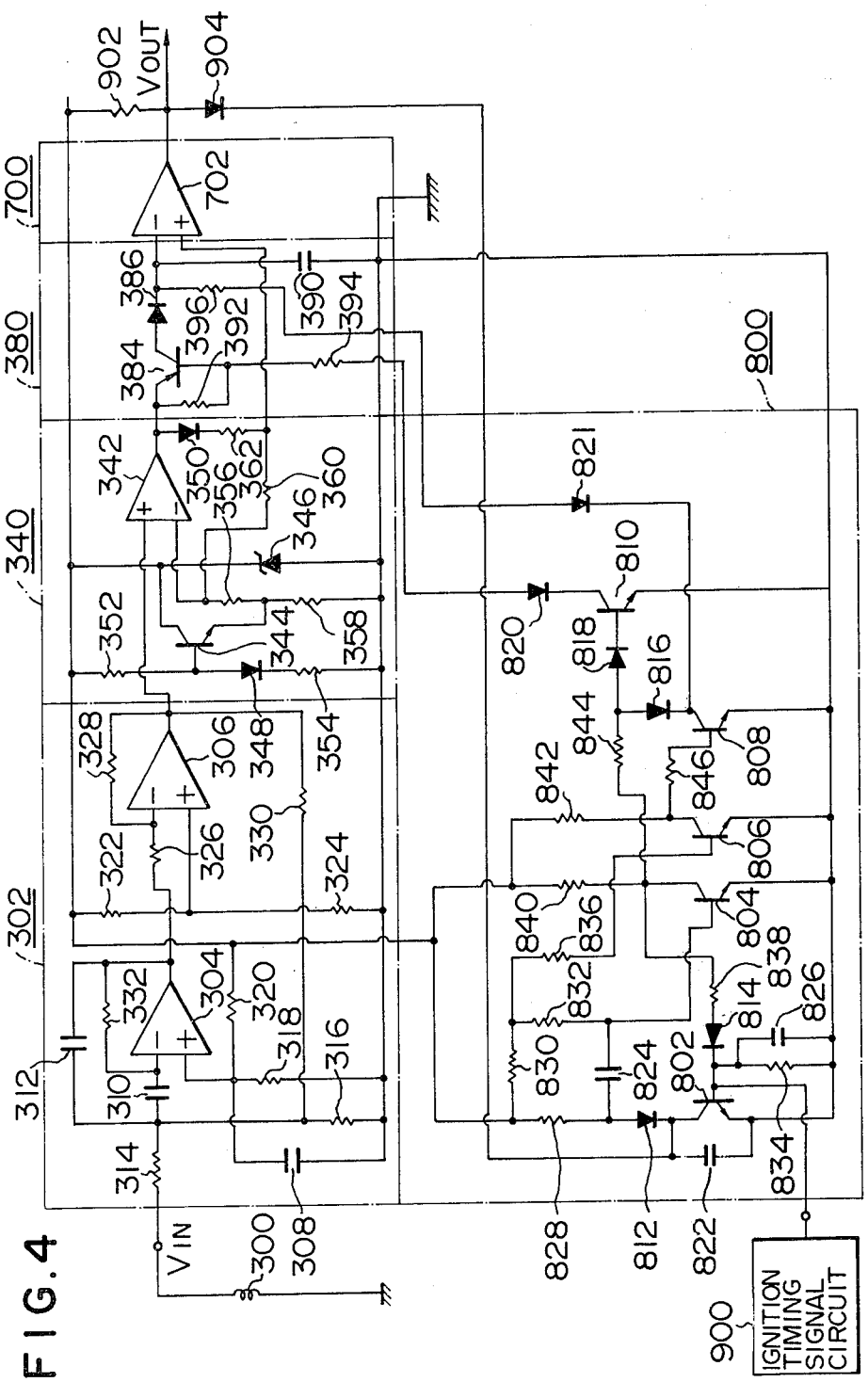
FIG. 4 is a circuit diagram of a particular circuit configuration of a knocking sensor shown in FIG. 1.

FIG. 4 shows a knocking detection circuit for producing the pulses KNCKP the number of which is proportional to the magnitude of knocking, in response to the detection of the occurrence of knocking by the knocking detector 30. In FIG. 4, a knocking sensor 300 comprises a magnetostrictive element and a pickup coil wound thereon and it converts the knocking vibration in the cylinder of the engine to an electric signal. An output signal Vin from the knocking sensor 300 is supplied to a band-pass filter 302 which functions to eliminate parasitic oscillation of the engine to efficiently extract the knocking vibration. The band-pass filter 302 comprises operational amplifiers 304 and 306, capacitors 308, 310 and 312 and resistors 314, 316, 318, 320, 322, 324, 326, 328, 330 and 332. It has a center frequency of 7 KHz and a pass-band width of $7\pm0.5$ KHz. The circuit including the operational amplifier 304 constitutes a filter circuit while the operational amplifier 306 constitutes an amplifier circuit. Those circuits are well-known and hence a detailed explanation thereof is omitted. The knocking signal passed through the band-pass filter 302 has a varying amplitude depending on the magnitude of knocking, i.e. light knocking, moderate knocking or heavy knocking. In the present invention, control is based on the occurrence of light knocking to prevent the occurrence of knocking heavier than light knocking.

The knocking signal passed through the band-pass filter 302 is applied to an attenuator 340 to optimize the amplitude for the comparison with a sample-hold value. The attenuator 340 comprises an operational amplifier 342, a transistor 344, a zener diode 346, diodes 348 and 350 and resistors 352, 354, 356, 358, 360 and 362.

A sample-hold circuit 380 functions to sample and hold the peak value of the output signal from the attenuator 340 and it comprises a transistor 384, a diode 386, a capacitor 390 and resistors 392, 394 and 396. The capacitor 390 is charged to the peak level of noise received during the on-period of the transistor 384, and the charged voltage is compared with a voltage at the junction of the resistors 360 and 362 of the attenuator by an operational amplifier 702 of a comparator circuit 700. The voltage at the junction is derived by dividing the output voltage of the amplifier 342 by the resistors 362, 360, 356 and 358 and it has a magnitude such that it causes the comparator circuit 700 to produce the output only when the amplifier 342 produces an output sufficiently larger than the noise level, that is, when the knocking signal is detected. Accordingly, the comparator circuit 700 produces pulses indicative of the knocking when the magnitude of knocking is higher than a predetermined level, that is, when the magnitude of knocking is heavier than light knocking.

A timing circuit 800 provides operational timing to the circuits described above and prevents the comparator circuit 700 from producing a pulse output in response to spurious signals, and it comprises transistors 802, 804, 806, 808 and 810, diodes 812, 814, 816, 818, 820 and 821, capacitors 822, 824 and 826, resistors 828, 830, 832, 834, 836, 838, 840, 842, 844 and 846. Applied to the transistor 802 of the timing circuit 800 is the output from an ignition timing signal circuit 900 which produces the ignition timing signal.

A diode 904 and a resistor 902 connected to the output terminals of the timing circuit 800 and the comparator circuit 700 constitute a masking circuit which renders the transistor 802 conductive for a predetermined time period after the ignition timing to ground the junction point to render the output $V_{OUT}$ to be zero for preventing the output from being produced by the ignition noise. This noise results from an electromagnetic wave generated by the ignition signal, which wave is detected by the coil of the sensor 300. In order to prevent the erroneous operation due to the noise, the masking circuit is provided.

The tranistors 802 and 804 form a first one-shot multivibrator. When the transistor 802 is turned on for a predetermined time period by the ignition timing signal from the ignition timing signal circuit 900, the transistor 804 is turned on in response thereto. The transistors 802 and 806 form a second one-shot multivibrator.

The transistor 808 forms a sample-hold discharging switch and the transistor 810 forms a sample hold charging switch. When the transistor 806 is off, the transistor 808 is on, and when the transistors 804 and 808 are both off, the transistor 810 is on. Accordingly, when the transistor 810 turns on, the transistor 384 of the sample-hold circuit 380 turns on and the capacitor 390 samples and holds signal. When the transistor 808 turns on, the charge in the capacitor 390 discharges through the resistor 396 and the diode 821.

Figure 5:
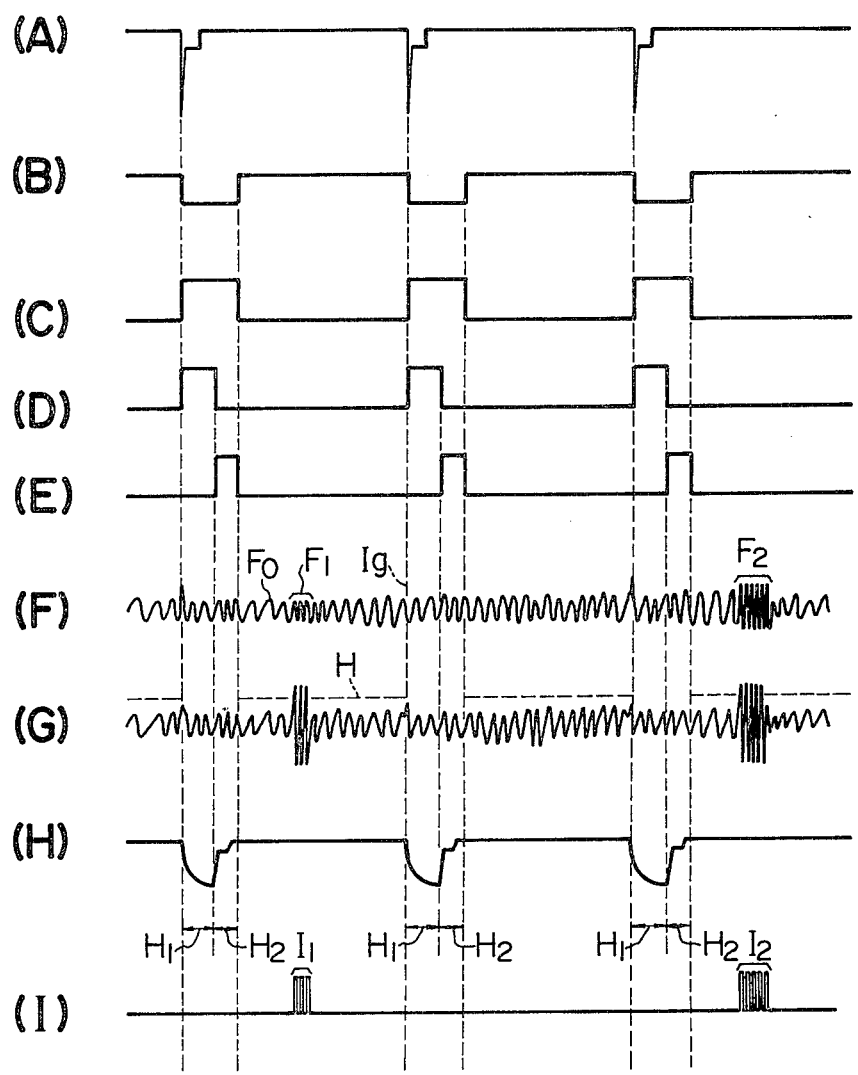
FIG. 5 shows waveforms at various points in the circuit shown in FIG. 4.

FIG. 5 shows the operation timing of the circuit described above, in which (A) indicates the ignition timing signal provided by the ignition timing signal circuit 900, (B) indicates the collector voltage of the transistor 802 which is turned on by the ignition timing signal, (C) indicates the collector voltage of the transistor 804 and (D) indicates the collector voltage of the transistor 806. The transistors 806 and 804 are turned off simultaneously but the transistor 806 is turned on earlier because of the voltage drop across the resistor 832 by the charging current to the capacitor 824. (E) indicates the base voltage of the transistor 810. This voltage is at a high level only when the transistor 808 is off, that is, the waveform (D) is at low level and the collector voltage of the transistor 804, i.e. the waveform (C) is at a high level.

(F) indicates the output signal waveform of the knocking sensor 300, FO indicates the signals other than the knocking signal, F1 indicates a light knocking signal, F2 indicates a moderate knocking signal, (G) indicates the output signal waveform of the knocking sensor 300 derived from the band-pass filter 302 at the frequency of 7 KHz, Ig indicates the ignition noise, (H) indicates the sample voltage in the sample-hold circuit 380, H1 indicates the sample-hold discharge timing corresponding to the high level period of the waveform (D), i.e. the on period of the transistor 808, and H2 indicates the sample-hold timing corresponding to the high level period of the waveform (E), i.e. the on period of the transistor 810. The level of the waveform (H)

corresponds to the level H shown in the waveform (G). The comparator circuit 700 produces an output only during the time portion in which the waveform (G) exceeds the level H.

(I) indicates the output $V_{OUT}$ of the comparator 700, that is, the knocking signal waveform, $I_1$ indicates light knocking signal and $I_2$ indicates the moderate knocking signal. It is seen that the number of pulses increases as the magnitude of knocking increases.

Figure 6:
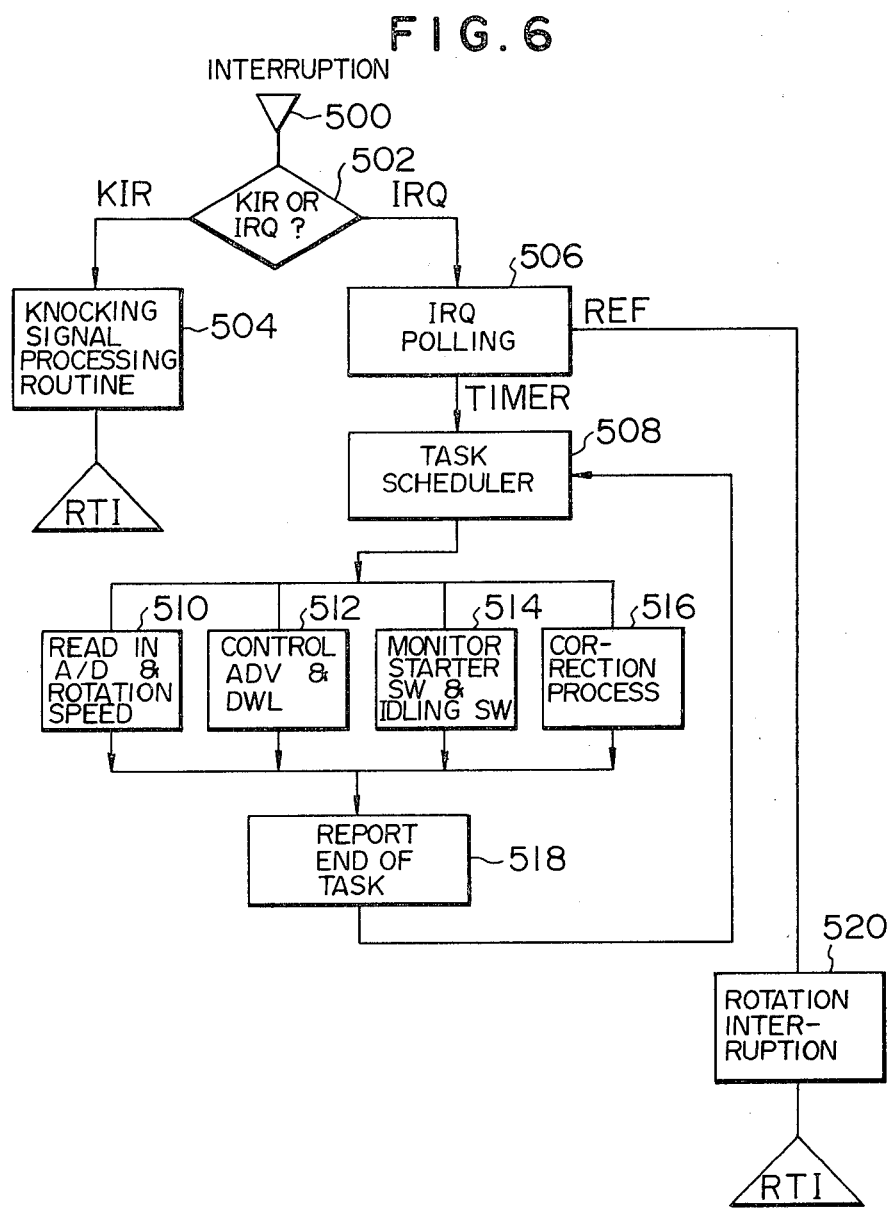
FIG. 6 is a flow chart showing an overall procedure of the engine control system of the present invention.

Referring now to FIG. 6 and the subsequent drawings, the ignition timing control program executed by the ignition timing control apparatus described above will be explained.

FIG. 6 shows a flow chart for the ignition timing control and the knocking signal processing routine in the control programs for the engine.

In FIG. 6, when an interruption 500 occurs, the next step 502 determines whether the interruption request is a knocking interruption request KIR or other interruption request IRQ. When the interruption request is the KIR, the knocking signal processing routine is executed in the step 504, and when the interruption request is determined to be the IRQ, the process proceeds to the step 506 where an interruption analyzing process determines whether it is a timer interruption (TIMER) or a reference interruption (REF). The timer interruption is the one which causes various tasks, which are to be executed in accordance with the program, to be executed sequentially in the order of higher priority at a fixed time interval, preferably at 10 msec. interval. The reference interruption is the one which causes the task to be executed for every predetermined angle of rotation of the crank shaft.

In the case of timer interruption, a task scheduler decides the order of execution of the tasks 510, 512, 514 and 516 in accordance with the priority orders assigned to the respective tasks. The task 510 is to read in various sensors such as analog-digital conversion (A/D) of the suction manifold negative pressure and the rotation speed, the task 512 is to control the ignition timing (ADV) and the conduction start timing (DWL) of the ignition coil, the task 514 is to monitor and control a starter switch and an idling switch, and the task 516 is a correction process. For each execution of the task, the end of task is reported to the task scheduler 508 at the step 518. Then, the task scheduler 508 instructs the execution of the next higher priority task.

When the reference interruption is determined by the interruption request analyzing process at the step 506, the step 520 starts to execute the rotation interruption. After the completion of the steps 504 and 520, the process returns to the initial condition at the step RTI.

Figure 7:
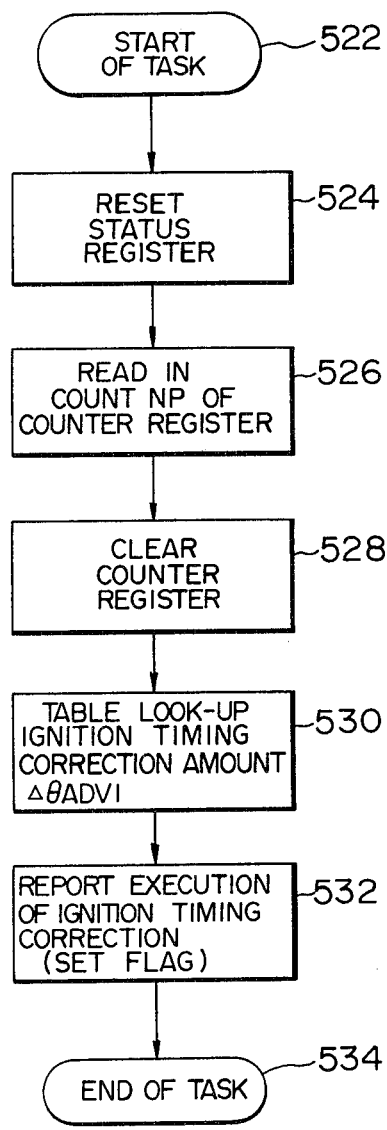

FIG. 7 shows the knocking signal processing routine 504. In FIG. 7, when the task starts at the step 522, the status register 236 which has been set to the time of completion of counting by the counter register 234 is reset at the step 524. In the step 526, the content NP of the counter register 234 is read in and then the counter register 234 is cleared at the step 528. The number of pulses NP read in indicates the magnitude of knocking, and based on this count the ignition timing correction amount $\Delta\theta_{ADV1}$ is calculated in accordance with $\Delta\theta_{ADV1} = f(NP)$ in the next step 530.

Usually, $\Delta\theta_{ADV1}$ is obtained by table look-up instead of calculation. The table is stored in the ROM 14 which contains the following values:

| NP | 1 | 2 | 3 | 4 | 5 or larger |
|---|---|---|---|---|---|
| $\Delta\theta_{ADV1}$ | 0° | 1° | 1° | 1° | 2° |

The correction amount $\Delta\theta_{ADV1}$ obtained at the step 530 is stored in the RAM 16. In the step 532, a flag indicating execution of the ignition timing correction, that is, to execute the correction of ignition timing is set, and in the step 534 the task ends and the process returns to the initial state.

In the above description, the number NP of knocking pulses is detected by hardware using the circuits 232, 234, 236 and 238 in the I/O interface circuit 20. A method for detecting the number NP of knocking pulses by software instead of using those circuits will now be explained.

The knocking pulses KNCKP from the knocking detector 30 are supplied to the CPU 12 via the path shown by the broken like in FIG. 1. The CPU 12 issues the non-maskable highest priority interruption request KIR in synchronism with the first one of the knocking pulses KNCKP, to start a software timer (S-timer) in the RAM 16 for counting up the number of pulses of the pulse sequence KNCKP received during the count period of the S-timer. Based on this count, a calculation is made to optimize the control for the ignition timing.

Figure 8:
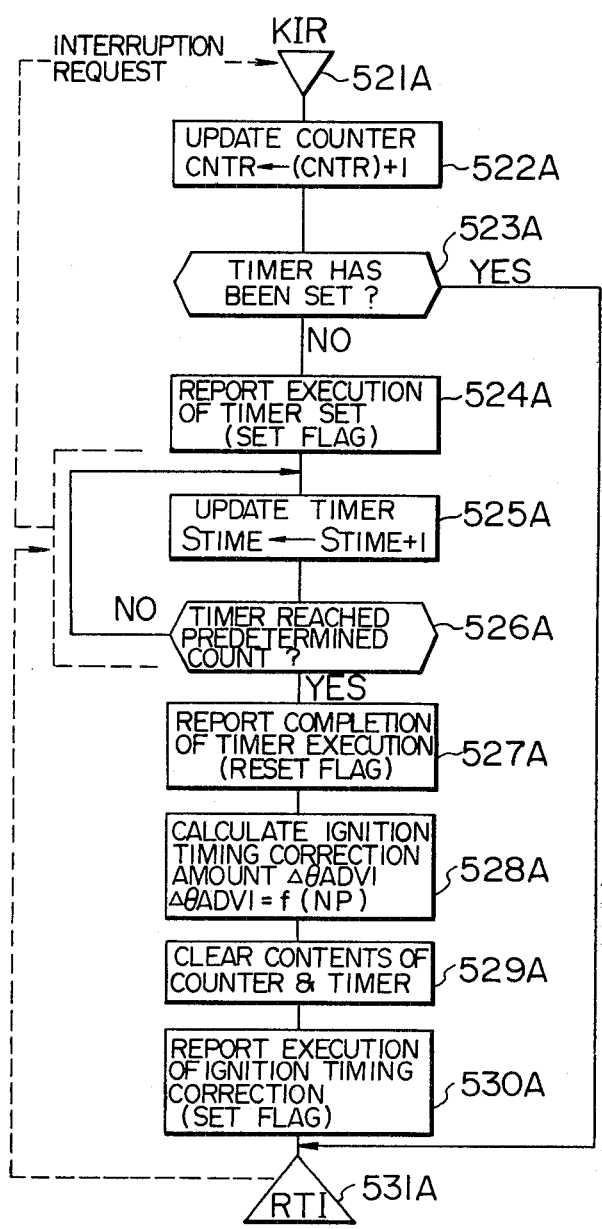

FIG. 8 shows the knocking signal processing routine 504. In FIG. 8, when the KIR interruption is requested in synchronism with the first one of the knocking signals KNCKP from the knocking detector 30 in the step 521A, a counter CNTR (not shown) in the RAM 16 starts to count at the step 522A, and each time a pulse of the knocking pulse sequence KNCKP is received the content of the counter CNTR is incremented by one. In the next step 523A, the set or reset condition of the S-timer is determined by checking a flag bit to be described later. If the S-timer has already been set, the process jumps to the step 531A and returns to the step 500 shown in FIG. 6 which is the program execution status immediately before the interruption sequence. On the other hand, if knocking is not occuring, the S-timer is not to have been set and the process proceeds to the step 524A when the first one of the knocking signals KNCKP is read into the counter CNTR and the execution of the S-timer set is reported, that is, the S-timer flag is set. At the step 525A, the S-timer starts to count at the first one of the knocking sinals KNCKP. At the step 526A, the content of the S-timer is checked to determine whether it has reached a preset count, which corresponds to a normal maximum duration of light knocking. It is determined experimentally and previously stored in the ROM 14.

When the updated count of the S-timer has not reached the preset count, the process returns to the step 525A and the S-timer is incremented by one. The S-timer continues to be updated during the activation thereof in accordance the loop formed by the steps 525A and 526A. During the activation of the S-timer, the pulse sequence signals KNCKP the number of which corresponds to the magnitude of knocking are read into the counter CNTR and counted thereby.

When the content of the S-timer reaches the preset count at the step 526A, the process proceeds to the step 527A where the completion of execution of the timer is reported, that is, the flag which has been set at the step 524A is reset. At the next step 528A, the ignition timing correction amount $\Delta\theta_{ADV1}$ is calculated in accordance with $\Delta\theta_{ADV1}=f(NP)$. The ignition timing correction amount $\Delta\theta_{ADV1}$ is a function of the count NP of the knocking pulses KNCKP received by the counter CNTR during the activation of the S-timer. Usually, the correction amount $\Delta\theta_{ADV1}$ is obtained by looking up the table described above.

At the step 529A, the contents of the counter CNTR and the S-timer are cleared to make them ready for the next knocking, and at the next step 530A, the execution of ignition timing correction is reported, that is, the flag indicating the execution of ignition timing correction is set. When the execution of ignition timing correction has been reported, the process returns to the initial status from the step 531A.

The update of the timer including the steps 525A and 526A and the update of the counter including the step 522A are explained in more detail. As described above, when knocking occurs, the interruption occurs in response to the pulse from the knocking detection circuit. In response to the interruption, the counter CNTR is updated at the step 522A. Since the S-timer is to be started at the first one of the pulses indicative of a series of knocking conditions received from the knocking detection circuit, the process initially proceeds to the steps 523A and 524A. At the step 524A the flag bit is set to indicate the activation status of the timer, and in the subsequent interruption this flag is checked at the step 523A so that the process proceeds to the "return to interrupt (RTI)" step 531A.

At the step 525A, the reference time is measured by software to update a timer counter (STIME), and at the step 526A it is determined whether a predetermined time has elasped or not. Thus, at the steps 525A and 526A, the passage of the predetermined time period is detected.

Since the interruption (KIR) is not inhibited during the time measurement in the steps 525A and 526A, the steps 525A and 526A are interrupted if the interruption request occurs in response to the successive knocking pulses KNCKP from the knocking detection circuit and the process again jumps to the step 521A where the KIR process starts. At the step 522A, the counter CNTR is again updated. In this case, since the flag has been set at the step 524A, the process jumps from the step 523A to the step 531A and returns to the interruption point, that is, the steps 525A and 526A. Accordingly, the YES decision at the step 523A results only when the KIR interruption occurs during the execution of the steps 525A and 526A. After the predetermined time period has passed, the process proceeds to the step 527A as described above.

Figure 9:
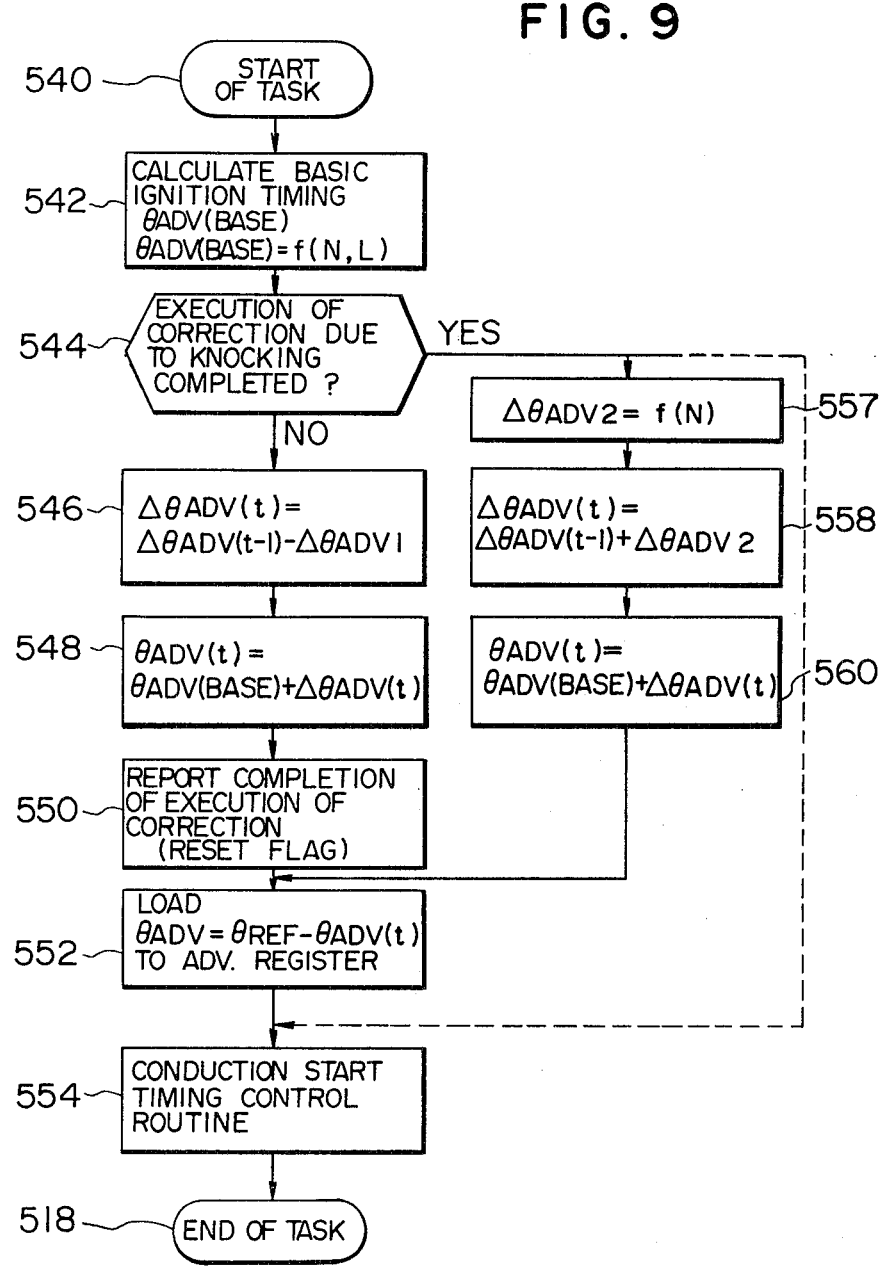
FIG. 9 is a flow chart of the ignition timing control routine shown in FIG. 6.

FIG. 9 shows the ignition timing control routine 512 shown in FIG. 6. The ignition timing control routine corrects the basic ignition advance angle $\theta_{ADV}$(BASE) with the ignition timing correction amount $\theta_{ADV1}$ and the normal correction amount $\theta_{ADV2}$. In FIG. 9, when the task starts at 540, the basic ignition timing $\theta_{ADV}$ (BASE) is calculated at the step 542 in accordance with $\theta_{ADV}$ (BASE)=f(N,L), when N is the engine rotation speed and L is the suction manifold negative pressure. This calculation method has been practiced in the prior art.

After the calculation, based on the flag which is set at the step 532 or 530A, it is determined whether the execution of correction due to knocking has been completed or not (YES or NO) at the step 544. If the correction for the knocking occurred has not been completed, the flag is in its set state and "NO" decision is obtained.

In this case, the process proceeds to the step 546, where the ignition timing correction amount $\Delta\theta_{ADV}(t)$ is calculated in accordance with the following formula:

$$\Delta\theta_{ADV}(t)=\Delta\theta_{ADV}(t-1)-\Delta\theta_{ADV1} \quad (1)$$

where $\Delta\theta_{ADV1}$ is a current correction amount which is to be added to the basic ignition advance angle $\theta_{ADV}$ (BASE), and $\Delta\theta_{ADV}(t-1)$ is a correction amount immediately before the correction. Since $\Delta\theta_{ADV1}$ is the amount to be retarded, it is subtracted from $\Delta\theta_{ADV}(t-1)$.

The ignition timing correction amount $\Delta\theta_{ADV}(t)$ calculated at the step 546 is added at the step 548 to the basic ignition advance angle $\theta_{ADV}$(BASE) calculated at the step 542, in accordance with the following formula:

$$\theta_{ADV}(t)=\theta_{ADV}(\text{BASE})+\Delta\theta_{ADV}(t) \quad (2)$$

After the correction at the step 548, the completion of the execution of correction is reported at the step 550, that is, the flag which has been set at the step 532 or 530A is reset.

At the step 552, the ignition timing data $\theta_{ADV}$ is calculated in accordance with the following formula and the result is loaded in the advance register 202;

$$\theta_{ADV}=\theta_{REF}-\theta_{ADV}(t) \quad (3)$$

where $\theta_{REF}$ is a crankshaft angle extending from the reference crank angle point P2 to the top dead center TDC of the engine as shown in FIG. 3. It is a fixed value.

After the ignition timing data $\theta_{ADV}$ has been loaded in the advance register 202, the conduction start timing control routine for loading the conduction start timing data $\theta_{DWL}$ to the dwell register 204 is executed at the step 554 and then the process proceeds to the end of task step 518. The calculation method for $\theta_{DWL}$ has been known and hence it is not explained here.

If it is determined, at the step 544, that the correction due to knocking has been executed, the correction amount $\Delta\theta_{ADV2}$ which depends on the rotation speed N of the engine is calculated at the step 557. This correction amount represents the magnitude of the angle to be advanced at a predetermined time interval, e.g. 20 msec. and it is a minimum unit for the advance angle correction amount. The correction amount $\Delta\theta_{ADV2}$ is selected to be 0.4°/sec. when N≧1000 r.p.m. where N is the rotation speed of the engine. In a preferred embodiment, the advance period is 20 msec. and hence the correction amount $\Delta\theta_{ADV2}$ is 0.008°. When the rotation speed N is smaller than 1000 r.p.m., the $\Delta\theta_{ADV2}$ is selected to be 1°/sec. i.e., 0.02° in the preferred embodiment. The correction rate of the advance angle is smaller at the higher rotation speed region because the higher the rotation speed the larger is the background noise received in the knocking detection circuit and hence the more difficult is the detection of knocking.

At the step 558, the ignition timing correction amount $\Delta\theta_{ADV}(t)$ is calculated in accordance with the following formula;

$$\Delta\theta_{ADV}(t)=\Delta\theta_{ADV}(t-1)+\Delta\theta_{ADV2} \quad (4)$$

where $\Delta\theta_{ADV}(t-1)$ is the correction amount immediately before the correction. The ignition timing correction amount $\Delta\theta_{ADV}(t)$ calculated at the step 558 is added to the basic ignition timing $\theta_{ADV}$(BASE) calculated at the step 542. The ignition timing $\theta_{ADV}$(t) is calculated in accordance with the following formula:

$$\theta_{ADV}(t) = \theta_{ADV}(BASE) + \Delta\theta_{ADV}(t) \quad (5)$$

It is seen from the above formula (5) that the ignition timing which was retarded depending on the magnitude of knocking when it occurred is advanced, after the knocking has stopped, by the ignition timing correction amount $\Delta\theta_{ADV2}$ which is the minimum correction unit, each time the task 512 is executed.

The ignition timing $\theta_{ADV}$(t) calculated at the step 560 is loaded into the advance register 202 at the step 552, and the conduction start timing control routine is executed at the step 554 and then the process proceeds to the end of task step 518.

In accordance with the ignition timing control of the present invention described above, the knocking stopping process proceeds depending on the magnitude of knocking upon the occurrence of knocking, and after the knocking has stopped the ignition timing is advanced by the minimum correction unit at a time so that the ignition timing is established at an optimum condition immediately before the knocking point with high precision. Accordingly, the running condition is enhanced and the maximum engine output is maintained. This is advantageous in enhancing the engine efficiency and minimizing the air pollution problem. The present invention is particularly effective to engines with turbochargers.

In the embodiment wherein the time control such as the establishment of read-in time for the pulse sequence signals, the number of which corresponds to the magnitude of knocking, provided by the knocking detection circuit, is implemented by software, the hardware for time control is not necessary. Accordingly, the number of components required is smaller and hence the cost of the apparatus can be reduced. Furthermore, in the present embodiment, the knocking signal is loaded directly into the CPU rather than through the I/O interface circuit. Accordingly, the process time from the occurrence of knocking to the start of ignition timing correction control is shortened and the controlability is enhanced.

Figure 10:
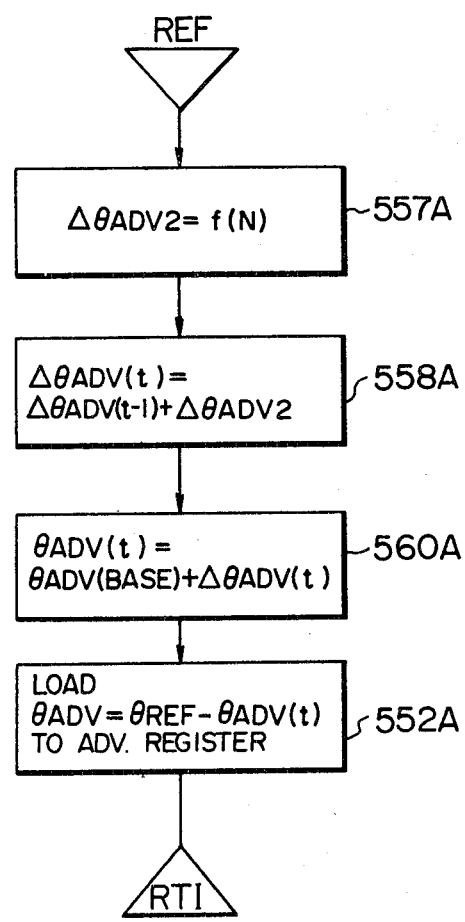
FIG. 10 is a flow chart showing an alternative example for the routine shown in FIG. 9.

The steps 557 to 560 in FIG. 9 show the example in which the ignition timing is advanced step by step at the predetermined time interval. Alternatively, a similar operation may be carried out in the rotation interruption processing routine 520 shown in FIG. 6, in which the ignition timing is advanced at every predetermined rotation angle of the crankshaft, preferably at every ignition cycle. A portion of the routine 520 for that purpose is shown in FIG. 10, in which the operations in the steps 557A, 558A, 560A and 552A correspond to those in the steps 557, 558, 560 and 552 in FIG. 9 and hence they are not explained here to avoid duplication. In the present embodiment, the steps 557, 558, 560 and 552 shown in FIG. 9 are not used. Accordingly, when the YES decision is made at the step 544, the process jumps to the step 554 as shown by a broken line.

Figure 11:
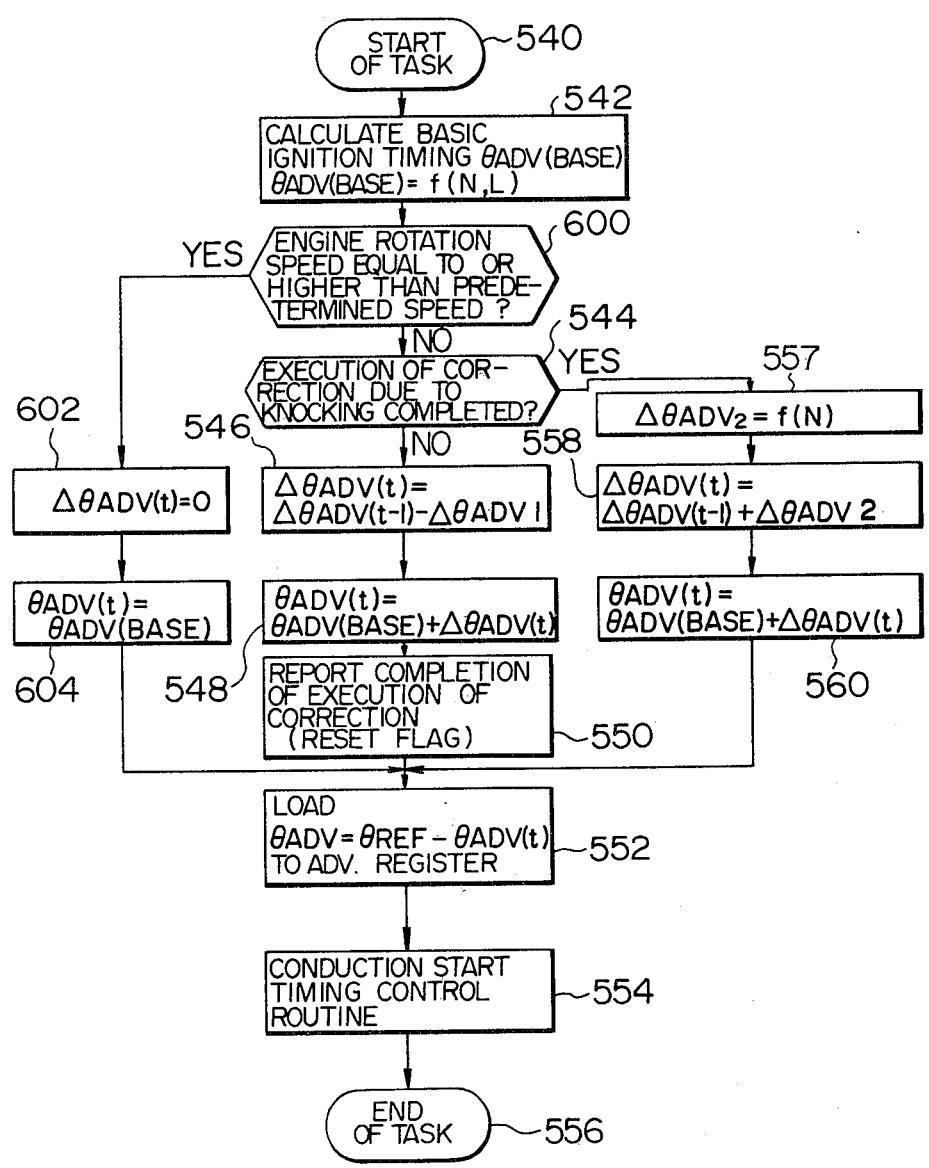
FIG. 11 is a flow chart showing another embodiment of the ignition timing control routine shown in FIG. 6.

FIG. 11 shows another embodiment of the ignition timing control routine 512. In the illustrated ignition timing control routine 512, a control step by the rotation speed of engine is additionally incorporated in the ignition timing control routine shown in FIG. 9 to eliminate the adverse affect due to the background noise at the high engine rotation speed region. More particularly, the step 600 is inserted after the step 542 to determine whether the engine rotation speed N is higher than a predetermined speed NK (NK > 1000 r.p.m.) or not, and if it is lower than the predetermined speed NK, that is, if a NO decision is rendered, the process assumes the same ignition timing control routine shown in FIG. 9, and if it is equal to or higher than the predetermined speed NK (i.e. a YES decision), the ignition timing correction amount $\Delta\theta_{ADV}$(t) is set to zero at the step 602 to stop the advancement of the angle. As a result, at the step 604, the ignition timing $\theta_{ADV}$(t) is defined only by the basic ignition timing $\theta_{ADV}$(BASE). Based on this data, the ignition timing data $\theta_{ADV}$ is calculated at the step 552 and the result is loaded to the advance register. The other steps are similar to those in the routine shown in FIG. 9 and hence an explanation thereof is omitted.

Figure 12:
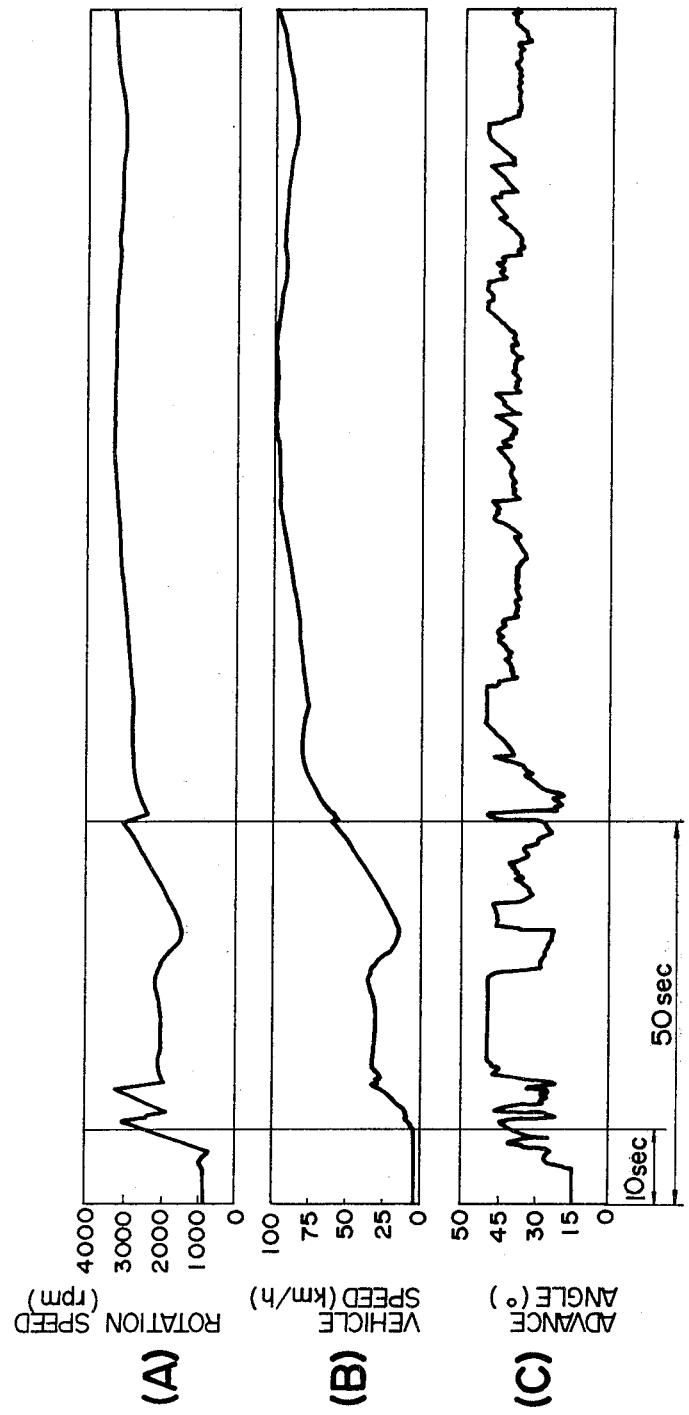
FIG. 12 is a chart showing the data measured for an apparatus which embodies the present invention.

Referring to FIG. 12, the result of the ignition timing control in accordance with the present invention will be explained. In FIG. 12, chart A shows the change of the engine rotation N (r.p.m.) from the start of the engine to the operation of the, chart B shows a vehicle speed, and chart C shows the advance angle in degree at the ignition timing. The ordinate represents the angle from the top dead center. The change of ignition advance angle shows the execution of knocking control.

What is claimed is:

1. Method for controlling ignition timing for an internal combustion engine comprising the steps of:
    a first step for reading in rotation speed information and load information of the engine to calculate engine ignition timing data,
    a second step for detecting knocking of the engine by generating a knocking magnitude signal representative of the magnitude of knocking by counting pulses for a predetermined period of time from the start of a knocking condition,
    a third step for producing a retardation angle correction amount to be used to correct the ignition timing in the direction of retardation in response to said knocking magnitude signal,
    a fourth step for correcting said ignition timing data in the direction of retardation based on said correction amount,
    a fifth step for correcting said ignition timing data in the direction of advancement periodically by a desired advance angle correction amount at a time, and
    a sixth step for establishing the ignition timing based on said ignition timing data.

2. Method for controlling ignition timing according to claim 1, wherein said second to fourth steps are executed by an interruption signal produced in response to a knocking condition signal from a knocking detector.

3. Method for controlling ignition timing according to claim 2, wherein said interruption signal is the first one of a sequence of pulses generated upon the occurrence of knocking.

4. Method for controlling ignition timing according to claim 1, wherein an interruption signal for executing said second and third steps is generated after the counting of said knocking pulses is completed.

5. Method for controlling ignition timing according to claim 1, further comprising:
    a seventh step for disabling said second to fifth steps when the rotation speed of the engine is equal to or higher than a predetermined rotation speed.

6. An apparatus for controlling ignition timing for an internal combustion engine comprising:

means for reading in rotation speed information and load information of the engine to calculate engine ignition timing data, means for detecting knocking of the engine to generate a knocking magnitude signal representative of the magnitude of knocking by counting pulses for a predetermined period of time from the start of a knocking condition, and means for executing the functions of producing a retardation angle correction amount to be used to correct the ignition timing in the direction of retardation based on said knocking magnitude signal, correcting said ignition timing data in the direction of retardation based on said correction amount correcting said ignition timing data in the direction of advancement periodically by a desired advance angle correction amount at a time, and establishing the ignition timing based on said ignition timing data.

7. A method of controlling ignition timing for an internal combustion engine comprising the steps of:
(a) generating base ignition timing data in accordance with prescribed operational conditions of the engine in response to which ignition timing of the engine is controlled;
(b) in response to the occurrence of a knocking condition, causing said base ignition timing data to be retarded by an amount dependent upon the magnitude of the knocking condition, said magnitude of the knocking condition being established by counting pulses for a predetermined period of time from the start of said knocking condition, so as to obtain retarded ignition timing data in response to which the ignition timing of the engine is controlled, so as to terminate the knocking condition; and
(c) successively advancing said retarded ignition timing data so as to establish the ignition timing at a timing immediately prior to the timing at which the knocking condition of the engine occurs.

8. A method according to claim 7, wherein the amount by which said retarded ignition timing data is advanced, successively in step (c), is less than the amount by which said base ignition timing data is retarded in step (b).

9. A method according to claim 7, wherein the rate at which said retarded ignition timing data is advanced in step (c) is dependent upon engine speed.

10. A method according to claim 9, wherein the rate at which said retarded ignition timing data is advanced in step (c) is lower at high engine speeds and higher at low engine speeds.

11. A method according to claim 7, wherein step (c) comprises the step of successively advancing said retarded ignition timing data at predetermined timing intervals.

12. A method according to claim 7, wherein step (c) comprises the step of successively advancing said retarded ignition timing data in accordance with the rotational position of the engine crankshaft.

13. A method according to claim 7, further comprising the steps of:
(d) prior to step (b), detecting whether the engine speed is equal to or higher than a prescribed speed; and
(e) in response to step (d) detecting the engine speed to be equal to or higher than said prescribed speed, setting the amount by which said ignition timing data is to be retarded in step (b) to zero and circumventing step (c) so as to cause the ignition timing to be established at a timing effectively determined by step (a).

14. A method according to claim 7, wherein said prescribed operational conditions include engine speed and load information.

15. A method of operating a processor-controlled apparatus for controlling the ignition timing of an internal combustion engine, in which ignition timing control signals are generated in accordance with ignition timing data, comprising the steps of:
(a) generating base ignition timing data in accordance with prescribed operational conditions of the engine; and
(b) in response to the occurrence of an engine knocking condition, causing an interrupt signal to be coupled to said processor in response to which said base ignition timing data is retarded by
(b1) generating a series of pulses in accordance with the magnitude of said engine knocking condition, and
(b2) retarding said base ignition timing data by an amount dependent upon the number of pulses generated during a preselected period of time.

16. A method according to claim 15, wherein, in step (b), respective interrupt signals are generated in accordance with said series of pulses, said preselected period of time being initiated in response to the first interrupt signal generated in accordance with said series of pulses.

17. A method according to claim 15, further comprising the step of
(c) successively advancing said retarded ignition timing data so as to establish the ignition timing at a timing immediately prior to the timing at which the knocking condition of the engine occurs.

18. A method according to claim 17, wherein the amount by which said ignition timing retardation data is advanced in step (c) is dependent upon engine speed.

19. A method according to claim 17, wherein step (c) comprises the step of successively advancing said ignition timing retardation data at predetermined time intervals.

20. A method according to claim 17, wherein step (c) comprises the step of successively advancing said ignition timing retardation data in accordance with the rotational position of the engine crankshaft.

21. A method according to claim 17, wherein the rate at which said ignition timing retardation data is advanced in step (c) is dependent upon engine speed.

22. A method according to claim 17, further comprising the steps of:
(d) prior to step (b), detecting whether the engine speed is equal to or higher than a prescribed speed, and
(e) in response to step (d) detecting the engine speed to be equal to or higher than said prescribed speed, setting the amount by which said ignition timing data is to be retarded in step (b) to zero and circumventing step (c), so as to cause the ignition timing to be established at a timing effectively determined by step (a).

23. A method of operating a processor-controlled apparatus for controlling the ignition timing of an internal combustion engine, in which ignition timing control signals are generated in accordance with ignition timing data, comprising the steps of:

(a) generating base ignition timing data in accordance with prescribed operational conditions of the engine; and
(b) in response to the occurrence of an engine knocking condition, causing an interrupt signal to be coupled to said processor in response to which said base ignition timing data is retarded by
  (b1) in response to the occurrence of an engine knocking condition, generating an interrupt signal to be coupled to said processor,
  (b2) in response to said interrupt signal, generating ignition timing retardation data, and
  (b3) modifying said base ignition timing data generated in step (a) in accordance with the ignition timing retardation data generated in step (b2), in response to which the ignition timing of the engine is controlled.

24. A method according to claim 23, wherein step (b2) comprises generating ignition timing retardation data in accordance with the magnitude of said engine knocking condition, whereby in response to step (b3), the knocking condition of the engine is terminated.

25. A method according to claim 24, further comprising the step of
  (c) successively advancing the ignition timing retardation data generated in step (b2), so as to establish the ignition timing at a timing immediately prior to the timing at which the knocking condition of the engine occurs.

* * * * *